United States Patent [19]

Fujiwara

[11] Patent Number: 4,798,451
[45] Date of Patent: Jan. 17, 1989

[54] BINOCULAR TUBE WHOSE ANGLE OF INCLINATION IS ADJUSTABLE

[75] Inventor: Hiroshi Fujiwara, Hachiouji, Japan

[73] Assignee: Olympus Optical Co., Ltd., Tokyo, Japan

[21] Appl. No.: 57,176

[22] Filed: Jun. 3, 1987

[30] Foreign Application Priority Data

Jun. 5, 1986 [JP] Japan ............................... 61-130961

[51] Int. Cl.⁴ ............................................. G02B 21/20
[52] U.S. Cl. .................................... 350/522; 350/513; 350/514
[58] Field of Search ................. 350/506, 507, 511–517, 350/522, 540–544, 569, 571

[56] References Cited

U.S. PATENT DOCUMENTS

| 3,409,343 | 11/1968 | Zapp | 350/569 |
| 3,459,465 | 8/1969 | Rosin et al. | 350/543 |
| 4,175,826 | 11/1979 | Blaha et al. | 350/522 |

FOREIGN PATENT DOCUMENTS

| 2502209 | 8/1975 | Fed. Rep. of Germany . | |
| 1267671 | 6/1961 | France | 350/542 |
| 53-70838 | 6/1978 | Japan . | |
| 1304941 | 1/1973 | United Kingdom | 350/516 |

*Primary Examiner*—John K. Corbin
*Assistant Examiner*—Martin Lerner
*Attorney, Agent, or Firm*—Cushman, Darby & Cushman

[57] ABSTRACT

In order to improve the operability concerning observation and manipulation by reducing the distance from the sample surface up to the eye-point of the observer, the binocular tube which is capable of being altered of its angle of inclination comprises a stationary tube unit, a movable tube unit rotatably secured to the stationary tube unit, an ocular tube unit rotatably mounted on the movable tube unit, first deflector means deflecting once the light beam advancing toward the ocular tube unit backwardly along its initial course of travel, the first deflector means being disposed in the optical path at a point between the ocular tube and the object being observed, and second deflector means for deflecting the light beam emitting from the first deflector means to advance along the optical axis of the ocular tube unit.

14 Claims, 5 Drawing Sheets

BINOCULAR TUBE WHOSE ANGLE OF INCLINATION IS ADJUSTABLE

BACKGROUND OF THE INVENTION

1. Field of the Invention:

The present invention relates to a binocular tube for microscopes, and more particularly it pertains to a binocular tube which can be adjusted of its angle of inclination for being suitable as a binocular tube for microscopes to be used in surgical operations.

2. Description of the Prior Art:

In a stereo-microscope, and especially in a microscope for surgical operations, the microscope per se is used to perform a surgical operation while observing the lesion of the patient. Therefore, in case an objective lens has a long focal distance, it is desired that the distance from the eye-point of the ocular lens up to the work surface be as short as possible, and also that the angle of inclination of the ocular tube can be adjusted or varied at will.

As such a tube whose angle of inclination can be varied, there is the one disclosed in, for example, Japanese Patent Preliminary Publication No. Sho 53-70838. This prior art tube will be described by giving reference to FIGS. 1 and 2. In FIG. 1, reference numeral 1 represents a stationary tube unit for holding a focusing lens 2, and this stationary tube unit is fixed to the microscope body M via a mount 1a. Numeral 3 represents a movable tube unit which is fitted in the stationary tube unit 1 for rotation in the directions of arrows A. Numeral 4 denotes a pair (but one of the pair is illustrated) of ocular tube units each holding an ocular lens not shown. This ocular tube unit 4 is fitted in the movable tube unit 3 for rotation in the directions shown by the arrows B for the purpose of adjusting the interval between the eyes and for causing adaptation to the selected direction of observation. Numeral 5 is a rotary mirror which is rotatably secured by an axis to the stationary tube unit 1 and coupled to the movable tube unit 3 via a transmission means 6. Numeral 7 represents a pair (but only one of the pair is illustrated) of 45° Dach prims disposed within the movable tube unit 3, and a relay lens 8 is secured to that surface of this prism which faces the rotary mirror 5 side. Numeral 9 denotes a pair (but only one of the pair is illustrated) of deflector mirrors disposed within the movable tube unit 3 but they are independent of the transmission means 6. Numeral 10 represents a pair (but only one of the pair is illustrated) of diamond-shaped prisms disposed in the respective ocular tube units 4, one for each ocular tube unit. The above-mentioned units and members constitute an image transmission system, and also the image formed by the focusing lens (image lens) 2 is focused as a correct or erect image on an intermediate image surface 11 via the transmission system. It should be noted here that the transmission means 6 is so designed that, in case the optical axis of the movable tube unit 3 is changed for an angle α by altering the angle of inclination of the ocular tube unit 4, the rotary mirror is rotated through an angle of α/2. Also, the play of the transmission means 6 which is developed due to a permissible manufacturing error is absorbed by a spring 12.

Accordingly, by the use of this tube arrangement, it should be noted that, even when the angle of inclination of the ocular tube unit 4 is altered, it is possible to achieve a correct observation of an erect image.

However, in the above-stated conventional device, the arrangement thereof is such that the optical path extends in a direction in which the optical path simply departs away from the rotary mirror 5. Accordingly, the tube arrangement per se tends to assume a large size. Also, as shown in FIG. 2, in case the angle of inclination of the ocular tube unit 4 is altered, the radius R of rotation from the center of rotation up to the ocular lens increases. Especially, when the angle of inclination becomes 90°, i.e. when the incident light to the tube becomes parallel with the emitting light therefrom, the distance L between the mounting surface 1b of the tube to the microscope and the mounting surface 4a of the ocular lens increases, with the result that the distance from the sample surface (work surface) to the eye-point of the observer increases, hence the drawback that the operability in both observation and manipulation is aggravated.

SUMMARY OF THE INVENTION

It is, therefore, a primary object of the present invention to provide a binocular tube whose angle of inclination can be changed such that the distance from the sample surface (work surface) up to the eye-point of the observer is reduced, with the result that the operability in both observation and manipulation can be improved.

According to the present invention, the above-mentioned object is attained by the provision of a first deflector means for deflecting the optical path extending toward the ocular tube unit is deflected once, midway of its course of travel, backwardly along its initial course of travel, and a second deflector means for deflecting said optical path so as to coincide with the optical axis of the ocular tube unit. Whereby, the size of the tube arrangement can be reduced, and also when the angle of inclination of the ocular tube unit is altered, the distance (radius of rotation) from the center of rotation up to the ocular lens can be reduced substantially.

According to a preferred formation of the present invention, the first deflector means is a pair of parallelly arranged stationary right-angled prisms or a parallelly arranged pair of mirror assemblies which are each comprised of a pair of stationary mirrors disposed at right angles relative to each other. The second deflector means is comprised of a pair of rotary mirrors which are parallelly provided for rotation and to face said rightangled pair of prisms or said mirror assemblies, respectively, whereby making it needless to provide such expensive optical devices as Dach prisms which are required to have a high degree of precision, and thus the manufacturing cost can be reduced.

According to another preferred formation of the present invention, the first deflector means is a parallelly arranged pair of right-angled prisms providing in the movable tube unit or a parallelly arranged pair of mirror assemblies which are each comprised of a pair of mirrors disposed in the movable tube unit so as to form right angles relative to each other; and the second deflector means is comprised of said pair of right-angled prisms or a pair of stationary mirrors provided in parallel to face said mirror assemblies, respectively.

According to still another preferred formation of the present invention, the pair of rotary mirrors or the pair of stationary mirrors which constitute the second deflector means is disposed so as to sandwich therebetween reflector members assigned to direct the paths of advancement of the light beams having passed through a pair of image lense toward said pair of right-angled prisms or mirror assemblies. Whereby, it becomes possible to constitute a tube having a reduced overall tube unit-totube unit distance and also to further reduce the radius of rotation of the ocular tube unit when its angle of inclination is varied.

This and other objects as well as the features and the advantages of the present invention will be apparent from the following detailed description of the preferred embodiments when taken in conjunction with the accompanying drawings.

DETAILED DESCRIPTION OF THE PREFERRED EMBODIMENTS

Figure 1:
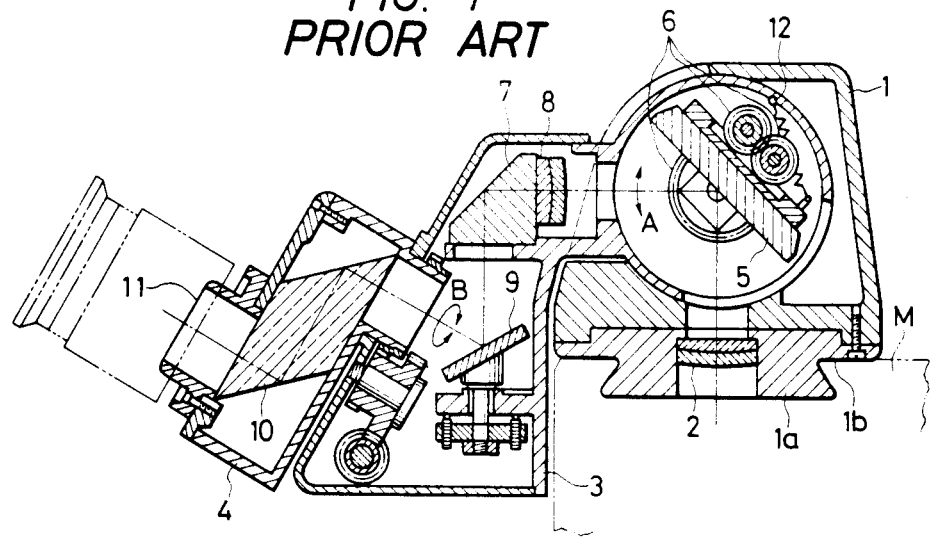
FIG. 1 is a sectional view of a conventional example of binocular tube whose angle of inclination can be varied.
Figure 2:
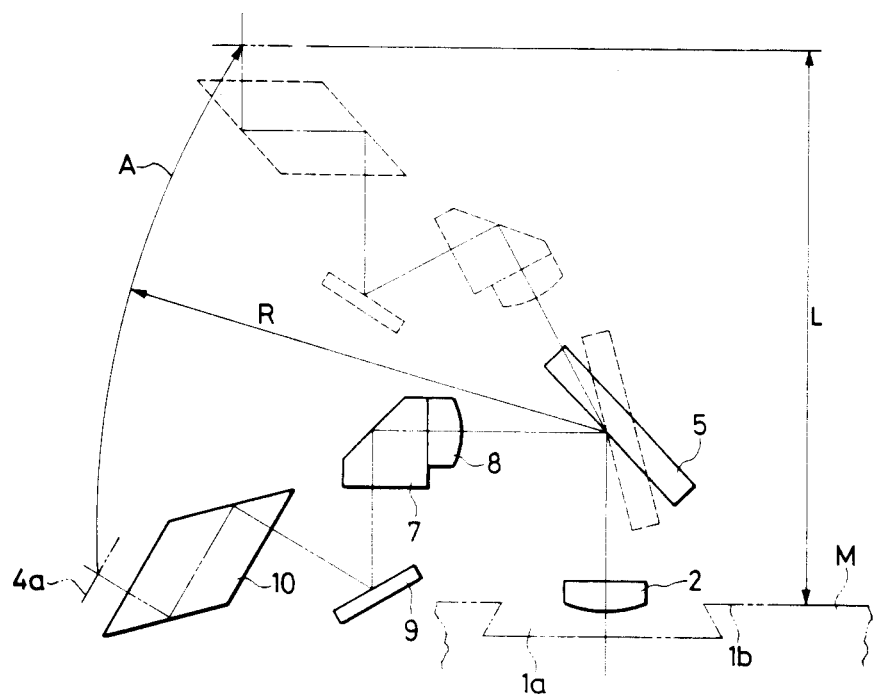
FIG. 2 is an illustration showing the changes of the angle of inclination of the ocular tube unit in the conventional example illustrated in FIG. 1.
Figure 3:
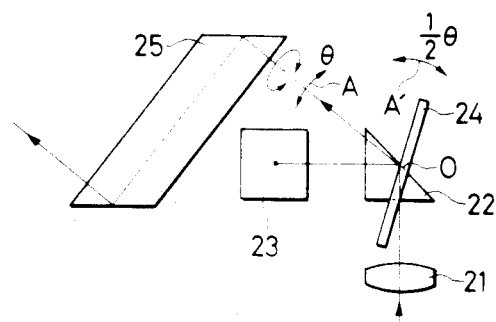
FIGS. 3 to 5 are a side elevation, a plan view an a perspective view, respectively, showing the basic structure of the optical system in the binocular tube which can be altered of its angle of inclination according to the present invention.
Figure 4:
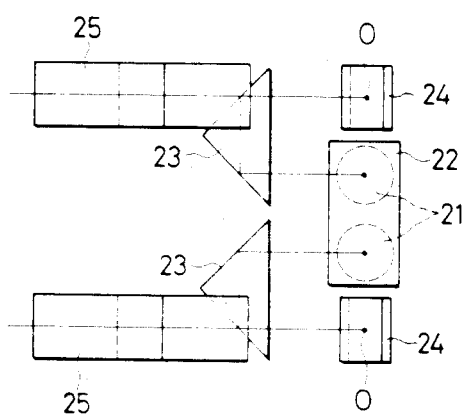
Figure 5:
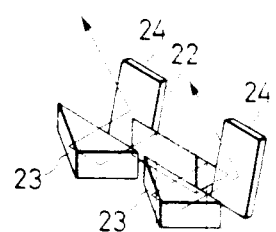

FIGS. 3 to 5 are a side elevation, a plan view and a perspective view, respectively, showing the basic structure of the optical system of the binocular tube according to the present invention. Reference numeral 21 represents a pair of image (focusing) lenses. Numeral 22 represents a stationary reflector member which is constructed as a prism for being used in common for the pair of image lenses 21, 21. Numeral 23 denotes a pair of right-angled prisms for deflecting once the optical paths of a pair of light beams which have passed through the pair of image lenses 21, 21, respectively, and have been reflected by the reflector member 22, backwardly along their initial courses of travel. This pair of prisms 23 constitutes a first deflector means. The prisms 23 may be located on a side of the reflector member 22 that is closer to the ocular tube or, in an alternate embodiment, on the opposite side of the reflector member relative to the ocular tube. Numeral 24 denotes a pair of rotary mirrors disposed so as to sandwich the stationary reflector member 22 therebetween, and constitutes a second deflector means. Numeral 25 represents a pair of diamond-shaped prisms which are rotatable around the optical axes, respectively, of the incident light beams coming from the pair of rotary mirrors 24, 24 and which are assigned to adjust the eye-to-eye distance of the observer. Here, arrangement is provided so that, when the diamond-shaped prism 25 is rotated through an angle $\theta$ in the direction of the arrow A about a reflection point O on the rotary mirror 24, the rotary mirror 24 will rotate in the same direction (in the direction of the arrow A') for an angle of only $\frac{1}{2}$ of the abovesaid angle $\theta$ of rotation about the reflection point O.

Because of the above-described structure, it should be noted here that, even when the angle of inclination of the diamond-shaped prism 25 (ocular tube unit) is changed, the image per se does not undergo any movement, and an erect image can be observed always. And, as compared with the conventional example, the tube as a whole can be formed in a compact size, and in addition the radius of rotation from the center O of rotation up to the ocular lens when the angle of inclination is altered can be reduced also.

Figure 6:
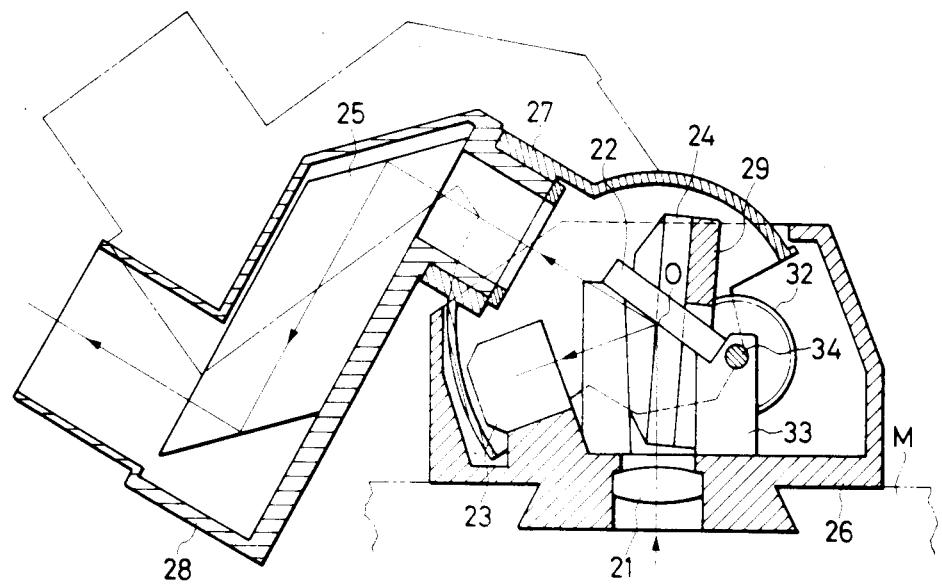
FIGS. 6 and 7 are a longitudinal sectional view and a cross sectional view of the essential portion, respectively, of a first embodiment of the binocular tube which can be altered of its angle of inclination according to the present invention.
Figure 7:
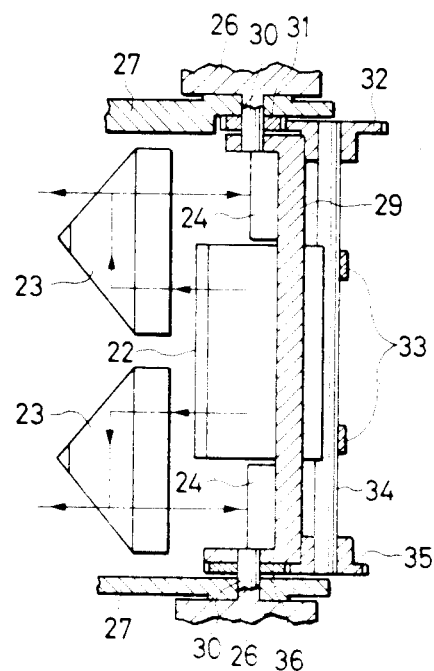

Description will hereunder be made in detail of a concrete embodiment using the above-stated optical system by referring to FIGS. 6 and 7.

Numeral 26 represents a stationary tube unit supporting an image lens 21 and housing therein a stationary reflector member 22, a right-angled prism 23 and a rotary mirror 24, and for being fixed to a microscope body M not shown. Numeral 27 represents a movable tube unit rotatably secured to the stationary tube unit 26. Numeral 28 represents a pair (but only one of the pair is illustrated) of ocular tube unit supporting an ocular lens not shown and housing therein a diamond-shaped prism 25 and being rotatably fitted in the movable tube unit 27. Numeral 29 represents a rotary mirror frame holding the rotary mirror 24. Numeral 30 represents a pair of shafts formed intergally on the stationary tube unit 26 and rotatably supporting the rotary mirror frame 29 and the movable tube unit 27. By means of this shaft, the rotary mirror 24 is rotated about its reflection point O. Numeral 31 denotes a gear rotatably mounted on the shaft 30 and is fixed to the movable tube unit 27. Numeral 32 represents a coupling gear which is reduced of its speed to $\frac{1}{2}$ of the gear 31 by being meshed with the gear 31, and this coupling gear is fixed to an end of a gear shaft 34 which is supported by a bearing 33 of the stationary tube unit 26. Numeral 35 represents a coupling gear fixed to the other end of the gear shaft 34. Numeral 36 represents a gear which is rotatably mounted on the shaft 30 and which is meshed with the coupling gear 35 and is fixed to the rotary mirror frame 29. Here, the number of teeth of the coupling gear 35 is identical with the number of teeth of the gear 36.

The binocular tube which can be altered of its angle of inclination according to the present invention is constructed as stated above. Therefore, the light rays which have passed through the objective lens of the microscope not shown pass through the image lens 21 and the stationary reflector member 22 and enter into the right-angled prism 23. The resulting light rays are reflected twice within this prism 23 as shown in FIG. 7, and the light rays travel toward the rotary mirror 24 (see FIG. 7) as if the light rays return along their initial course of travel. Furthermore, these light rays are reflected by the rotary mirror 24 and then enter into the diamond-shaped prism 25, and enter into the ocular lens not shown. Thus, it is impossible to observe an erect image of the object through the ocular lens.

Here, when the movable tube unit 27 is rotated to thereby alter th angle of inclination of the ocular tube unit 28 as shown by the chain line in FIG. 6, the rotary mirror 24 rotates in the direction same as that of the movable tube unit 27 through an angle which is one half of the angle of rotation of the movable tube unit 27 by virtue of the actions of the respective gears 31, 32, 35 and 36. Accordingly, by the law of reflection, the visual field within the ocular lens does not undergo any change, and thus it is possible to observe the non-distorted image of the object.

Description has been made above of the functional principle of the binocular tube according to the present invention. It should be noted here that the binocular tube of the present invention is of the arrangement that the optical path is bent once, part of its way, toward the backward direction, so that the tube can be made in a compact size, and in addition, in case the angle of inclination of the ocular tube unit 28 is altered, the radius of rotation from the center of rotation up to the ocular lens can be reduced. As such, the distance from the sample surface (work surface) up to the eye-point of the observer is reduced, with the result that the operability in both observation and manipulation is improved. Also, there is no need to use any expensive optical device as Dach prism which is required of a high degree of precision, and accordingly the manufacturing cost becomes low.

Figure 8:
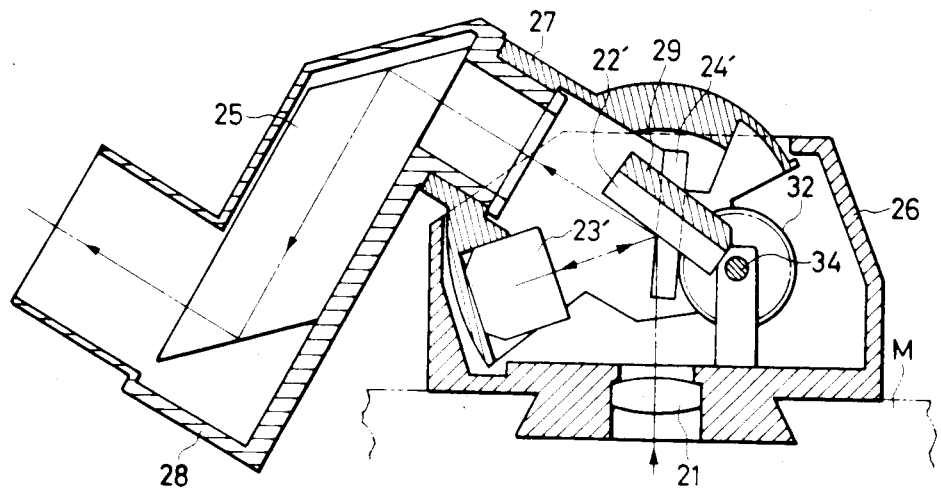
FIGS. 8 and 9 are a longitudinal sectional view and a cross sectional view of the essential portion, respectively, of a second embodiment of the binocular tube which can be altered of its angle of inclination according to the present invention.
Figure 9:
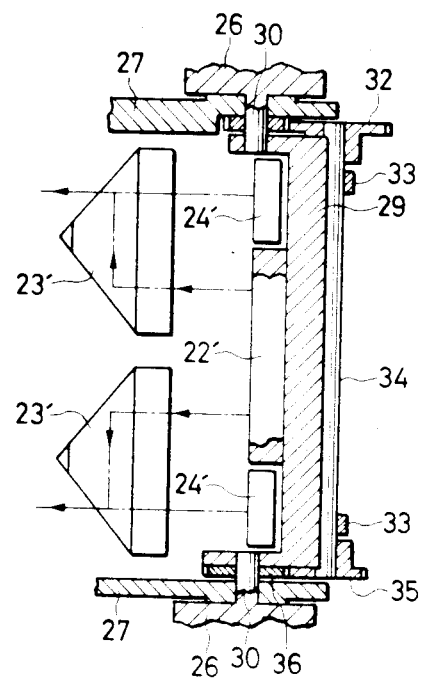

FIGS. 8 and 9 show another embodiment of the present invention. This embodiment differs from the preceding embodiment in that a reflector member 22' corresponding to the stationary reflector member 22 is mounted on a rotary mirror frame 29, and a right-angled prism 23' corresponding to the right-angled prism 23 is mounted on the movable tube unit 27 and that a mirror 24' corresponding to the rotary mirror 24 is mounted on the stationary tube unit 26. The remainder structure and the functions are same as those of the already described embodiment, so that parts same as those shown in FIGS. 6 and 7 are assigned with same reference numerals and symbols, and their detailed description is omitted.

Figure 10:
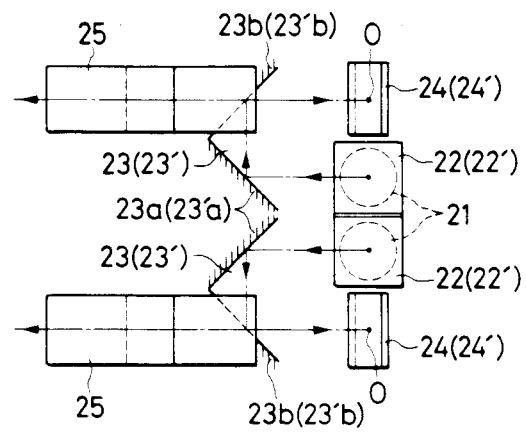
FIG. 10 is a plan view similar to FIG. 4 showing a modification of the first and second embodiments.

In the above-mentioned embodiments, it is invariable that the reflector member 22, 22' is constructed as a single prism or mirror which is in common for a pair of image lenses 21, 21, and also that the first deflector means 23, 23' is formed as a pair of right-angled prisms. It should be noted here, however, that, as shown in FIG. 10, the reflector member 22, 22' may be constructed as a pair of prisms or mirrors for the pair of image lenses 21, 21, respectively. Also, the first deflector means 23, 23' may be constructed as a parallelly arranged pair of mirror assemblies which are each comprised of a pair of mirrors 23a, 23b; 23'a, 23'b which are disposed to form right angles by each pair, respectively.

Figure 11A:
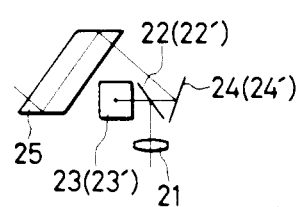
FIGS. 11A and 11B are a side elevation and a plan view, respectively, of the optical system of a third embodiment of the binocular tube which can be altered of its angle of inclination according to the present invention.
Figure 11B:
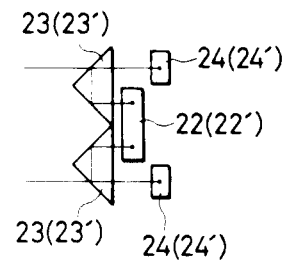

FIGS. 11A and 11B are a side elevation and a plan view, respectively, of the optical system of still another embodiment. In this case, the rotary mirror 24 (stationary mirror 24') is disposed at a rear wardly displaced position. According to such a structure as this, there can be disposed gears 31, 32, 35 and 36 between a pair of rotary mirrors 24, 24 (between a pair of stationary mirrors 24', 24'), so that it is possible to construct a tube which has a reduced distance between the overall outer edges of the binocular tubes.

Figure 12A:
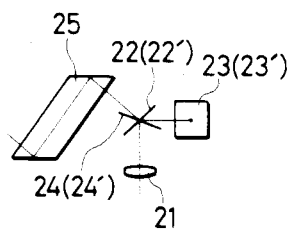
FIGS. 12A and 12B are a side elevation and a plan view, respectively, showing the optical system of a fourth embodiment of the binocular tube which can be altered of its angle of inclination according to the present invention.
Figure 12B:
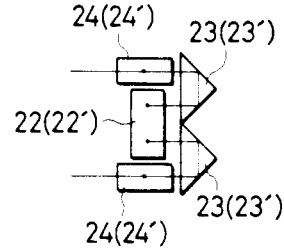

FIGS. 12A and 12B are side elevation and a plan view of the optical system of a further embodiment. In this case, a right-angled prism 23 (23') is disposed at a position opposite to the diamond-shaped prism 25 relative to both the stationary mirror 22 and the rotary mirror 24 (rotary mirror 22' and stationary mirror 24'). According to such a structure as mentioned just above, it is possible to further reduce the interval between the rotary mirror 24 (stationary mirror 24') and the diamond-shaped prism 25. Thus, the radius of rotation when the angle of inclination of the ocular tube unit is altered can be further reduced as compared with the already described respective embodiments.

As will be apparent from the foregoing description, the binocular tube according to the present invention can be applied as well without requiring modification to stereo-microscopes, binoculars and the like.

What is claimed is:

1. A binocular tube whose angle of inclination is adjustable, comprising:

a stationary tube unit;

a movable tube unit rotatably secured to said stationary tube unit;

an ocular tube unit rotatably mounted on said movable tube unit;

first deflector means mounted on said stationary tube unit for deflecting the light advancing toward said ocular tube unit to turn the light backwardly in the direction of its initial course of travel, said first deflector means being located at a point intermediate the path of travel of the light beam from the object being observed to said ocular tube unit; and second deflector means rotatably supported on said stationary tube unit for deflecting the light emitting from said first deflector means so as to advance along the optical axis of said ocular tube unit.

2. A binocular tube according to claim 1, in which:

said first deflector means is comprised of, a parallelly arranged pair of stationary right-angled prisms, said second deflector means is comprised of a pair of rotary mirrors rotatably arranged in parallel to face said pair of right-angled prisms, respectively.

3. A binocular tube according to claim 1, in which:

said first deflector means is comprised of a parallelly arranged pair of mirror assemblies each being formed with a pair of stationary mirrors disposed to form right angles, respectively, said second deflector means is comprised of a pair of rotary mirrors rotatably and parallelly arranged to face said pair of mirror assemblies, respectively.

4. A binocular tube according to claim 1, further comprising:

a pair of image lenses mounted on said stationary tube unit; and a reflector member mounted on said stationary tube unit to lead the light beams which have passed through said pair of image lenses, respectively, to impinge onto said first deflector means, said second deflector means being constructed as a pair of rotary mirrors disposed on both sides of said reflector member to sandwich said reflector member therebetween.

5. A binocular tube according to claim 1, further comprising:

a pair of image lenses mounted on said stationary tube unit; and a reflector member mounted on said stationary tube unit for leading the light beams which have passed through said pair of image lenses, respectively, to impinge onto said first deflector means, said second deflector means being constructed as a pair of rotary mirrors disposed on both sides of said reflector member at positions departing farther from said first deflector means than the position of said reflector member.

6. A binocular tube according to claim 4 or 5, in which:
said first deflector means is disposed on a side closer to said ocular tube unit than is said reflector member.

7. A binocular tube according to claim 5, in which:
said first deflector means is disposed on a side opposite to said ocular tube unit relative to said reflector means.

8. A binocular tube whose angle of inclination is adjustable, comprising:
a stationary tube unit;
a movable tube unit rotatably mounted on said stationary tube unit;
an ocular tube unit rotatably mounted on said movable tube unit;
first deflector means mounted on said movable tube unit for deflecting the light advancing toward said ocular tube unit to turn the light backwardly in the direction of its initial course of travel, said first deflector means being located at a point intermediate the path of travel of the light beam from the object being observed to said ocular tube unit; and
second deflector means mounted on said stationary tube unit for deflecting the light emitting from said first deflector means to advance along the optical axis of said ocular tube unit.

9. A binocular tube according to claim 8, in which:
said first deflector means is comprised of a parallelly arranged pair of movable right-angled prisms, and
said second deflector means is comprised of a pair of stationary mirrors disposed in parallel to face said pair of right-angled prisms, respectively.

10. A binocular tube according to claim 8, in which:
said first deflector means is comprised of a parallelly arranged movable mirror assemblies each being formed with a pair of mirrors disposed to form right angles relative to each other, and
said second deflector means is comprised of a pair of stationary mirrors disposed in parallel to face said pair of mirror assemblies, respectively.

11. A binocular tube according to claim 8, further comprising:
a pair of image lenses mounted on said stationary tube unit; and
a reflector member mounted on said movable tube unit for leading the light beams which have passed through said pair of image lenses, respectively, to impinge onto said first deflector means,
said second deflector means being comprising of a pair of stationary mirrors disposed on both sides of said reflector member to sandwich said reflector member therebetween.

12. A binocular tube according to claim 8, further comprising:
a pair of image lenses mounted on said stationary tube unit; and
a reflector member mounted on said movable tube unit for leading the light beams having passed through said pair of image lenses, respectively, to impinge onto said first deflector means,
said second deflector means being constructed as a pair of stationary mirrors disposed on both sides of said reflector member at a position departing farther from said first deflector means than the position of said reflector member.

13. A binocular tube according to claim 11 or 12, in which:
said first deflector means is disposed on a side closer to said ocular tube unit than the position of said reflector member.

14. A binocular tube according to claim 12, in which:
said first deflector means is disposed on a side opposite to said ocular tube unit relative to said reflector member.

* * * * *